Jan. 31, 1961  L W PASCHALL  2,969,769
DOG FEEDER
Filed Aug. 18, 1958  2 Sheets-Sheet 1

INVENTOR
L W Paschall

BY Mason, Fenwick & Lawrence
ATTORNEYS

Jan. 31, 1961
L W PASCHALL
2,969,769
DOG FEEDER
Filed Aug. 18, 1958
2 Sheets-Sheet 2
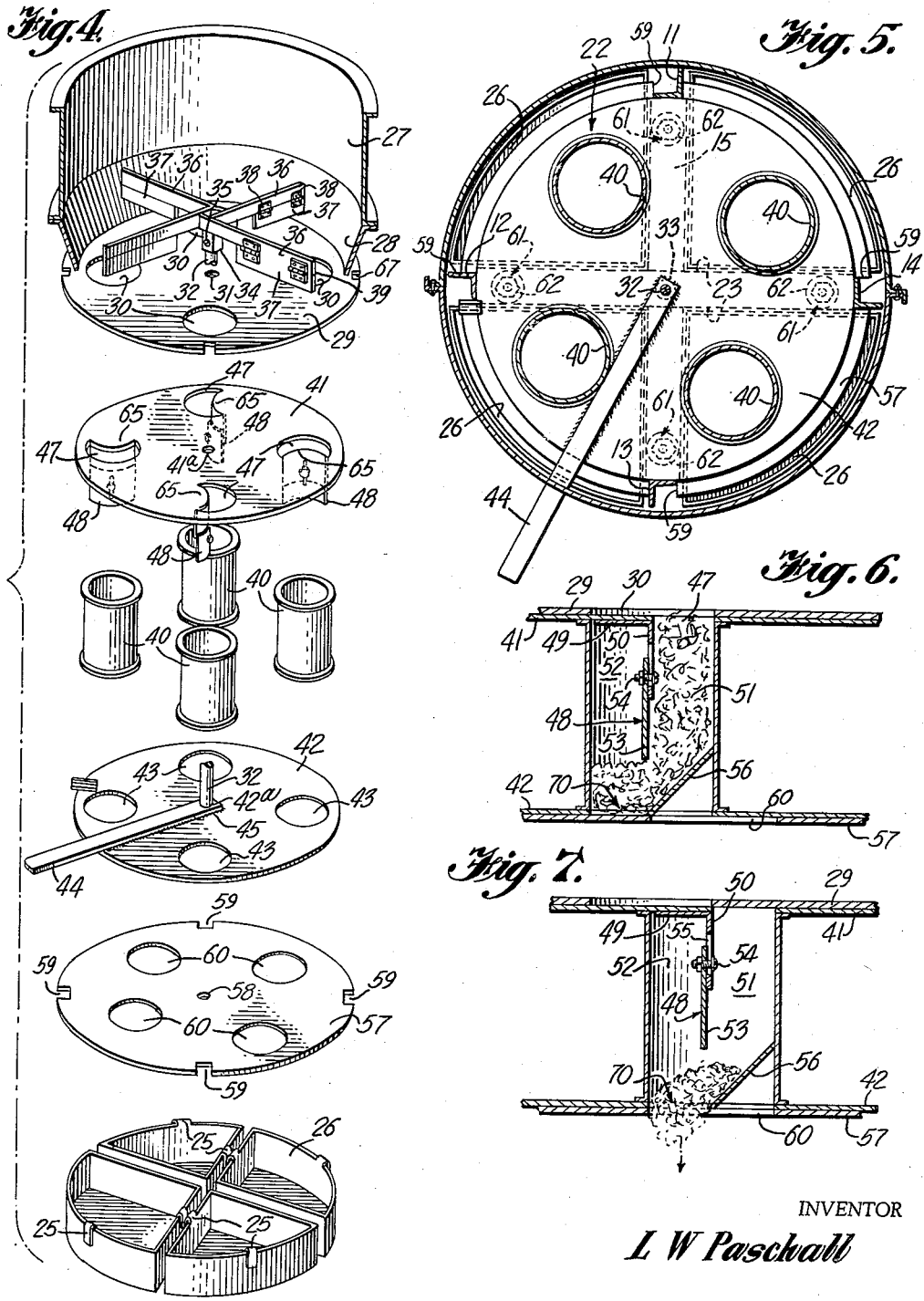
INVENTOR
*L W Paschall*
BY *Mason, Fenwick & Lawrence*
ATTORNEYS United States Patent Office 2,969,769
Patented Jan. 31, 1961

2,969,769
DOG FEEDER
L W Paschall, 1421 Vine St., Murray, Ky.
Filed Aug. 18, 1958, Ser. No. 755,728
6 Claims. (Cl. 119—56)

This invention relates to a feeding device and more particularly to a feeding device for feeding a plurality of dogs.

It is desirable to feed each dog an equal quantity of food at a meal. If all the dogs are fed from one container, there will be some that are overfed and others which do not obtain enough food to keep them healthy. The preparation of individual meals involves a great deal of time and labor. When the meals are taken to the enclosure where the dogs are kept, it is difficult for one person to provide each dog with a serving and keep the others away from it. Some of the dogs will eat very fast and run to the container of a dog that eats slower to get as much as he can from the latter's container. The difficulty of presenting the food to all the dogs at one time, enables the more aggressive animals to get the first meals presented and then raid the containers of the less aggressive dogs. The result is that food is frequently spilled and many fights among the animals occur; and the labor of preparing individual measured quantities of food goes for naught.

Consequently it is an object of the present invention to provide a device which presents to each dog in an enclosure an equal amount of food.

It is a further object to provide a feeder which presents said equal amount of food to all the dogs in an enclosure simultaneously.

It is a still further object of the present invention to provide a feeder for a plurality of dogs in which only one dog can eat from one of the serving stations and he cannot see the food of any of the other dogs.

Other objects and advantages of the present invention will become apparent to those skilled in the art from the following description when read in conjunction with the accompanying drawings, wherein:

Figure 4 is an exploded view of the inner portion of the dog feeder shown in Figure 2 to show the relationship of the measuring and dispensing components;

Figure 5 is a horizontal sectional view taken on the line 5—5 of Figure 2;

Figure 6 is an enlarged vertical sectional view taken on the line 6—6 of Figure 3 showing one of the measuring canisters being filled with food from the hopper above; and Figure 7 is a view similar to Figure 6 but showing the measuring canister after it has been moved away from the hopper outlet to one of the dog feeding trays below.

Figure 1:
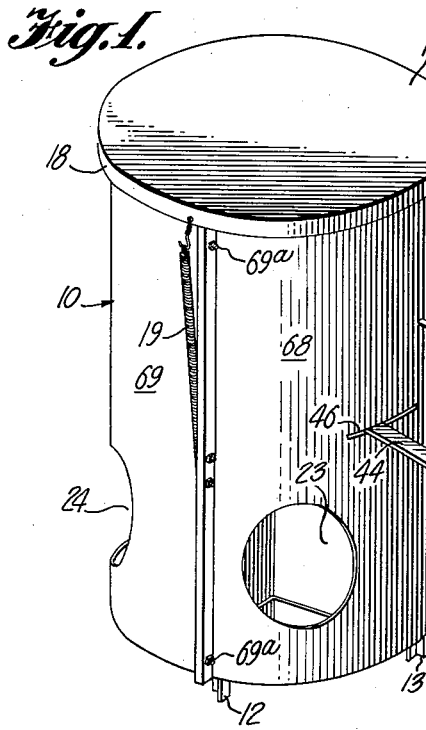
Figure 1 is a perspective drawing of the dog feeder of the present invention.
Figure 2:
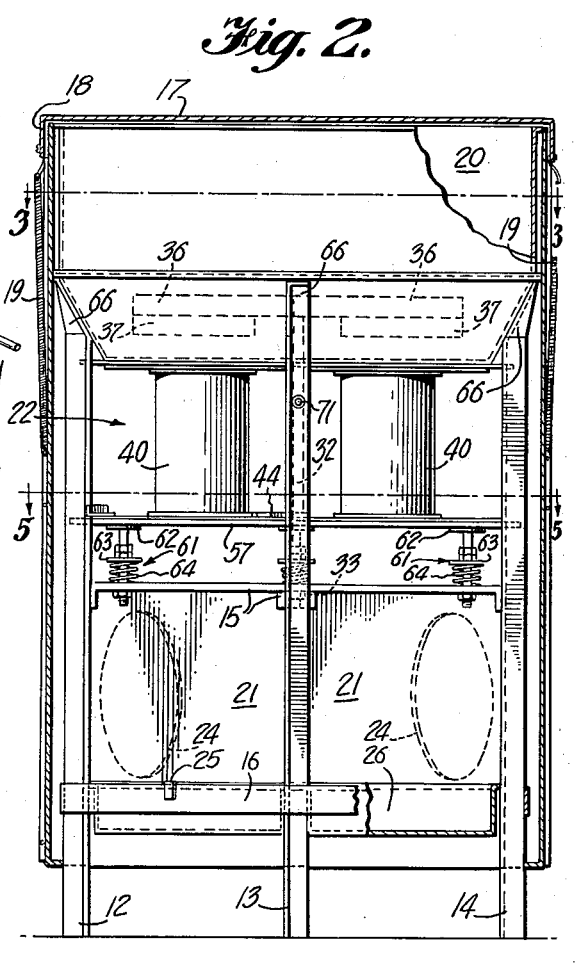
Figure 2 is a vertical sectional view of the dog feeder shown in Figure 1.
Figure 3:
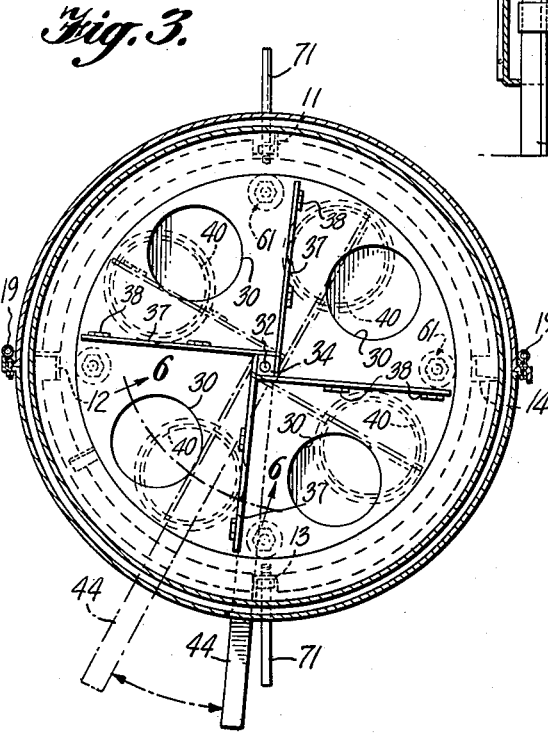
Figure 3 is a horizontal sectional view taken on the line 3—3 of Figure 2.

Adverting now to the drawings and more particularly Figures 1 and 2, there is shown a dog feeder made in accordance with the present invention. The dog feeder used for illustrating the invention provides feeding stations for four dogs. However, it will be obvious that dog feeders having more or less stations may be provided in accordance with the invention. Also the present invention will be described with respect to an all metal feeder but it will be realized that other suitable materials such as wood or combinations of materials may be used.

The numeral 10 denotes a cylindrical outer casing or jacket supported on an inner framework including four vertically disposed angle iron members 11, 12, 13 and 14 braced by a centrally located horizontal cruciform member 15 and a circular strap member 16. A lid or cover 17 having an annular down turned flange 18 closes the top of the casing 10 and is resiliently held in place by a pair of oppositely disposed springs 19. The cover 17 may be grasped by one hand at a point on its periphery intermediate the springs 19 and using the opposite side from that grasped as a fulcrum it can be raised against the bias of the springs 19 to obtain access to the interior of the feeder. It may also be raised a short distance to clear the flange 18 and slid across the top of the casing 10 and off of the other side of the top of the casing where it will be resiliently held to the side of the casing 10.

Within the casing 10, a food storage compartment or hopper 20 occupies the upper portion, feeding stations 21 the lower portion, and a measuring and dispensing means 22 is located intermediate the said hopper and feeding stations.

Each of the feeding stations 21 has a baffle 23 bent at right angles, which with the casing 10 forms the sides of the quadrant shaped feeding station 21. The baffles 23 are secured in place by attachment to a pair of the angle iron members 11, 12, 13 and 14 and the cruciform member 15. An access 24 is provided in the casing 10 for each of the feeding stations 21 to comfortably receive the head of a dog but not of a size to permit more than one dog to enter his head within the feeding station. Suspended in suitable manner at the bottom of each feeding station as by a plurality of clips 25 which engage the strap member 16 and apertures (not shown) in the baffle 23 is a removable feeding tray 26. The tray 26 may be removed by reaching under the edge of the casing 10, tilting the tray upward to disengage the clips and lowering it edgewise to the ground and then turning it to a horizontal position to bring it out from under the edge of the casing 10.

The hopper 20 has a cylindrical top portion 27 and an inwardly tapered or funnel like bottom portion 28 and an apertured bottom closure 29. The bottom closure 29 is provided with the outlets 30 spaced in the present example 90° apart as best seen in Figure 4. One outlet 30 is provided for each dog feeding station.

An axial bearing 31 is provided in the bottom closure 29 to receive an operator shaft 32 which has its lower end mounted in a bearing 33 centered in the cruciform member 15. The shaft 32 projects into the hopper 20 and a sleeve 34 having an axial bore and a square cross-section is received on the projecting end of said rod and removably fastened as by a bolt or set screw 35.

The paddles or scrapers 36 having their inner ends attached in a suitable manner as by welding to the faces of the sleeve 34 may be made of heavy gauge strap iron, or other suitable material and mounted to present a relatively broad face to the food in the hopper to urge it to the openings 30 when the paddles 36 are rotated. A pivoted scraper 37 is dependingly mounted on each of the paddles 36 by means of a pair of hinges 38. The hinges 38 are mounted on that face of the paddles 36 which moves the food toward the openings 30, the abutting edges of the paddle and scraper portion as at 39 forming a stop to prevent pivoting of the scraper portion when the paddles are rotated in one direction.

When the paddles are rotated in an opposite direction the scrapers 37 pass over food which has been moved toward the opening 30.

The measuring and dispensing compartment 22 comprises four measuring canisters 40 according to the present example mounted intermediate an apertured top inlet valve disk 41 and an apertured outlet valve disk 42. The outlet valve disk 42 has four apertures 43 spaced 90° apart, and one of the canisters 40 is fixedly mounted in axial alignment with each of the apertures 43, the apertures 43 being of a diameter equal to that of the canisters 40. An operator handle 44 is attached as by welding 45 to the valve disk 42, said handle extending outwardly through a slot 46 in the casing 10. The outlet valve disk 42 is centrally bored and fixedly attached to the shaft 32.

The inlet valve disk 41 having an axial bore 41a is provided with four crescent shaped apertures 47 spaced 90° apart. Dependingly disposed about the inner arc of each of the crescent shaped apertures 47 is an adjustable length measuring separator 48. The separator 48 has a horizontal attachment member 49 for fixedly attaching said separator to the underside of the valve disk 41 and a vertically depending arcuate flange 50 which separates the canister 40 into two compartments 51 and 52. An adjustable extension 53 is mounted by means of a belt 54 which is received in a vertical slot 55 in the flange 50. An inclined baffle 56 is fixedly attached at the bottom of the compartment 51 to direct the flow of food from the compartment 51 to the bottom of the compartment 52 under the lower end of the separator 48 when the canister 40 is assembled with the inlet valve disk 41 and the separator 48 is received in said canister.

A presser plate 57 having an axial bore 58 is mounted on shaft 32 below the outlet valve disk 42 for free vertical movement on said shaft. One of the stops 59 on said presser plate engages each of the angle iron frame members 11, 12, 13, 14 to hold the disk 57 against rotation. The presser plate 57 has four apertures 60 arranged 90°.

Near the outer end of each of the arms of the cruciform member 15, a spring-biased member 61 comprising a flat headed bolt 62 having an adjustably fixed collar 63 and a spring 64 interposed between the collar 63 and the cruciform member 15 to bias the flat head of the bolt 62 away from the cruciform member 15.

In assembling the hopper 20 and the measuring and dispensing means 22, the presser plate 57 is seated on the spring-biased members 61, with the stops 59 of the presser plate engaging the vertical frame members, 11, 12, 13, 14. The apertures 60 of the presser plate 57 are of the same size as the outlets 30 and have centers the same radial distance from the axis of the members but the centers of the apertures 60 are offset circumferentially with respect to the outlets 30 so that there is no portion of the outlets 30 vertically overlying the apertures 60. In the present example the centers of the apertures 60 are offset 34° circumferentially with respect to the centers of the outlets 30.

The inlet valve disk 41, the canisters 40 and the outlet valve disk 42 are fabricated as an integral unit by welding the top edges of the canisters 40 to the inlet valve disk 41 after the separators 48 have been positioned in the canisters. The bottom edges of the canisters 40 are welded to the outlet valve disk 42 after handle 44 is welded to the outlet valve disk. The unit is then assembled on the shaft 32, said shaft passing through the bore 41a and the bore 42a of the inlet valve disk 41 and the outlet valve disk 42 and handle 44, respectively. The unit is then fixedly attached to the shaft by tack welding.

The crescent shaped apertures 47 are laid out by the intersection of circles having the same radius as the outlet 30, and one of the circles having its center on the other circle to form the crescent portion 65 the radius of which is at right angles to the radius of the inlet valve disk 41. The baffle 56 divides the outlet of the canister 40 diametrically.

The hopper 20 is fixed as by welding or other suitable fastening means to the offset portions 66 of the frame members 11, 12, 13 and 14 and the stops 67 of the bottom closure 29 engage said frame members. The biasing of the presser plate 57 forces the canister assembly unit tightly against the bottom closure 29 of the hopper 20 to prevent feed from entering between the moving parts.

The casing 10 is made in two parts 68 and 69 bolted together by means of a plurality of bolts 69a. The handle 44 is received in the slot 46 at the time of assembling the casing.

Feed for the dogs is placed in the hopper 20 and a number of dogs not exceeding the number of feeding stations, four in the present example, enter the enclosure in which the feeder of the present invention is located. The canisters 40 are positioned so that when the hopper is filled the food will flow into the compartment 51 and under the separator 48 and down the baffle 56 to the bottom 70 of compartment 52. Since the bottom 70 of compartment 52 does not overlie the apertures 60 the presser plate 57 forms a closure for the compartment 52, as shown in Figure 6. By moving the handle 44 20° in a counterclockwise direction, the aperture 47 passes from under the outlet 30 and the inlet valve disk 41 closes the outlet; and the bottom 70 of compartment 52 is moved over the aperture 60 so that the measured contents of each of the canisters 40 drop into the respective tray 26. Thus, each dog will simultaneously receive an equal portion of food which he can devour undisturbed by the other dogs.

When the handle 44 is returned to its starting point the canisters 40 are refilled from the supply in the hopper 20. After the first group of dogs have been fed they are removed from the enclosure, another group enters, and the manipulation of the feeder is repeated.

To assist in the manipulation of the feeder, a hand grip 71 is provided for one hand, while the other hand is used for operating the lever 44.

By raising the extension plate 53 of the separator 48, a greater amount of food may flow into the canister 40, since a larger amount of the food can then flow into the compartment 52.

The arrangement of the crescent portion 65 of the inlet valve disk 41 and the baffle 56 permits operation of the feeder with a relatively small movement of the handle 44. With each oscillation of the handle 44, food is advanced toward the openings by means of the paddles 36, to prevent caking of the food across the outlets 30.

While there has been disclosed in the foregoing description a practical embodiment of the feeding device for feeding dogs in accordance with the present invention, it will be understood by those skilled in the art that variations in the implementation of the concept of the invention are within the purview and scope of the invention.

What is claimed is:

1. A feeding device for measuring and dispensing food for animals comprising, a feeding station, a hopper mounted in superposed relation above said feeding station, said hopper having a downwardly disposed outlet, a measuring container, a divider within said measuring container dividing said measuring container into a food receiving compartment and a food outlet compartment, said divider being substantially shorter than the height of said container, said food outlet compartment having a closure at its top and an opening at its bottom, said food receiving compartment having an opening at its top and an angularly disposed transversely positioned closure at its bottom for guiding food from said food receiving compartment into said food outlet compartment under said divider, said measuring container having a downwardly disposed outlet interposed between said feeding station and said hopper, plate means in engagement with said downwardly disposed outlet of said measuring container, said plate means having an aperture in communication with said feeding station, and means operable to move said measuring means to alternately place it in communication with said downwardly disposed outlet of said hopper and said aperture in said plate means.

2. A feeding device for measuring and dispensing food for animals comprising, a vertically disposed framework, a feeding station supported within said framework adjacent the base thereof, a hopper supported by said framework in superposed relation with respect to said feeding station, said hopper having an outlet in its bottom, a rotatably mounted valve plate having an aperture registering with said hopper outlet, a measuring container, a divider within said measuring container dividing said measuring container into a food receiving compartment and a food outlet compartment, said divider being substantially shorter than the height of said container, said food outlet compartment having a closure at its top and an opening at its bottom, said food receiving compartment having an opening at its top and an angularly disposed transversely positioned closure at its bottom for guiding food from said food receiving compartment into said food outlet compartment under said divider, said measuring container being in fixed communication with said valve plate aperture and rotatable therewith, plate means in engagement with the botom of said measuring container, said plate means having an aperture in vertical alignment with said feeding station and in offset relation with respect to said hopper outlet, and means operable to rotate said measuring container to alternately place it in communication with said hopper outlet and said aperture in said plate means, respectively.

3. A feeding device for measuring and dispensing food for animals comprising, a vertically disposed framework, a plurality of animal feeding stations mounted on said framework adjacent the base thereof, a hopper mounted on said framework in superposed relation above said feeding stations, said hopper having a plurality of spaced outlets in its bottom, a rotatably mounted valve plate having a plurality of apertures corresponding to said hopper outlets and registering therewith, a plurality of measuring containers, each in fixed communication with one of said apertures in said valve plate and rotatable therewith, plate means in engagement with the bottoms of said measuring containers, said plate means having an aperture registering with each of said measuring containers and in vertical alignment with one of said feeding stations and in offset relation with a corresponding one of said hopper outlets, means operable to rotate said measuring containers to alternately place each of said measuring containers in communication with one of said hopper outlets and one of said apertures in said plate means, respectively, a jacket mounted on said framework to surround said feeding device, said jacket having an entrance aperture for each of said feeding stations, said entrance aperture being sized to freely admit the head of one dog and exclude the entrance of the heads of more than one dog and having an aperture adjacent each of said feeding stations to receive an animal's head while feeding and baffle means separating each of said feeding stations from adjacent feeding stations.

4. A feeding device for measuring and dispensing food for animals comprising, a vertically disposed framework, a plurality of animal feeding stations mounted on said framework adjacent the base thereof, a hopper mounted on said framework in superposed relation above said feeding stations, said hopper having a plurality of spaced outlets in its bottom, a rotatably mounted valve plate having a plurality of apertures corresponding to said hopper outlet and registering therewith, a plurality of measuring containers, each in fixed communication with one of said apertures in said valve plate and rotatable therewith, a divider within each of said measuring containers dividing said containers into a food receiving compartment and a food outlet compartment, said divider being substantially shorter than the height of said container, said food outlet compartment having a closure at its top and an opening at its bottom, said food receiving compartment having an opening at its top and an angularly disposed transversely positioned closure at its bottom for guiding food from said food receiving compartment into said food outlet compartment under said divider, plate means in engagement with the bottoms of said measuring containers, said plate means having an aperture registering with each of said outlet compartments and in vertical alignment with one of said feeding stations and in offset relation with a corresponding one of said hopper outlets, means operable to rotate said measuring containers to alternately place each of said outlet compartments of measuring containers in communication with one of said hopper outlets and one of said apertures in said plate means, respectively, a jacket mounted on said framework to surround said feeding device and having an aperture adjacent each of said feeding stations to receive an animal's head, and baffle means separating each of said feeding stations from adjacent feeding stations.

5. A feeding device for measuring and dispensing food for animals comprising, a vertica'ly disposed framework, a plurality of feeding stations supported within said framework, a hopper supported by said framework in superposed relation above said feeding stations, said hopper having a plurality of spaced outlets in its bottom, a plurality of spaced measuring containers interposed between said feeding station and said hopper and registering with the outlets of said hopper, a divider within each of said measuring containers dividing said containers into a food receiving compartment and a food outlet compartment, said divider extending from the top of said measuring container and terminating substantially above the bottom of said container, said food outlet compartment having a closure at its top and an opening at its bottom, said food receiving compartment having an opening at its top and an angularly disposed transversely positioned closure at its bottom for guiding food from said food receiving compartment into said food outlet compartment under said divider, plate means in engagement with the bottoms of said measuring containers, said plate means having apertures in vertical alignment with said feeding stations and in offset relation with said hopper outlets, and means operable to simultaneously rotate said measuring containers to alternately place said measuring containers in communication with said hopper outlets and said apertures in said plate means, respectively.

6. In a dog feeder, the improvement comprising, in combination, a casing provided with a plurality of dog feeding stations, a hopper for storing a supply of dog food, said hopper being mounted in superposed relation to said dog feeding stations, measuring means interposed between said hopper and said plurality of dog feeding stations for simultaneously transferring a measured quantity of dog food from said supply in said hopper to each of said dog feeding stations, said measuring means including measuring compartments in superposed relationship to each dog feeding station, means within each said measuring compartments adjustably varying the capacity of each measuring compartment, a baffle separating each feeding station from adjacent feeding stations so that a dog feeding at one station will not be disturbed by a dog feeding at an adjacent station, a jacket enclosing said feeding stations, said jacket having an entrance aperture for each feeding station to receive the head of a dog while feeding, said aperture being sized to exclude the head of a second dog in said aperture.

References Cited in the file of this patent

UNITED STATES PATENTS

| 940,540 | Loop et al. | Nov. 16, 1909 |
| 2,399,016 | Gits | Apr. 23, 1946 |
| 2,500,243 | Dixon | May 14, 1950 |